(12) United States Patent
Shinohara (10) Patent No.: US 9,250,689 B2
(45) Date of Patent: Feb. 2, 2016

(54) CONTROL SERVER, NETWORK CONTROL METHOD, AND PROGRAM

(75) Inventor: Yusuke Shinohara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 299 days.

(21) Appl. No.: 14/009,711

(22) PCT Filed: Apr. 4, 2012

(86) PCT No.: PCT/JP2012/002369
§ 371 (c)(1),
(2), (4) Date: Oct. 3, 2013

(87) PCT Pub. No.: WO2012/137501
PCT Pub. Date: Oct. 11, 2012

(65) Prior Publication Data
US 2014/0025970 A1    Jan. 23, 2014

(30) Foreign Application Priority Data

Apr. 4, 2011 (JP) ................................. 2011-082887

(51) Int. Cl.
*G06F 1/32* (2006.01)
*H04L 12/64* (2006.01)
(Continued)

(52) U.S. Cl.
CPC .......... *G06F 1/3234* (2013.01); *H04L 12/6418* (2013.01); *H04L 45/12* (2013.01);
(Continued)

(58) Field of Classification Search
CPC ... G06F 1/3234; H04L 41/0833; H04L 45/70; H04L 45/123
See application file for complete search history.

(56) References Cited

U.S. PATENT DOCUMENTS

2007/0195700 A1*  8/2007  Katoh ................. H04L 12/2602
                                                           370/235
2009/0067331 A1   3/2009  Watsen et al.
(Continued)

FOREIGN PATENT DOCUMENTS

CN    101087220 A    12/2007
CN    101217381 A    7/2008
(Continued)

OTHER PUBLICATIONS

International Search Report dated Jan. 5, 2012 in International Patent Application Publication No. PCT/JP2012/002369.
(Continued)

*Primary Examiner* — Albert Wang
(74) *Attorney, Agent, or Firm* — McGinn IP Law Group, PLLC (57) ABSTRACT

A control server selects part of nodes included in a first communication network, generates a second communication network from the selected nodes, determines a forwarding probability of a packet between a node and its next hop node in the second communication network to calculate a communication volume between at least one pair of nodes included in the second communication network with respect to a prescribed traffic using the determined forwarding probability, and calculates a link cost for at least one pair of nodes included in the second communication network based on the determined forwarding probability and the calculated communication volume, adds at least one node included in the first communication network to the second communication network so that the calculated link cost satisfies a prescribed condition, and puts nodes not included in the second communication network in a low power consumption mode.

18 Claims, 8 Drawing Sheets

(51) Int. Cl.
*H04L 12/721* (2013.01)
*H04L 12/717* (2013.01)
*H04L 12/715* (2013.01)
*H04W 40/08* (2009.01)

(52) U.S. Cl.
CPC ............. *H04L 45/123* (2013.01); *H04L 45/38* (2013.01); *H04L 45/42* (2013.01); *H04L 45/64* (2013.01); *H04W 40/08* (2013.01)

(56) References Cited

U.S. PATENT DOCUMENTS

| 2010/0157830 | A1 | 6/2010 | Yazaki et al. | |
| 2011/0075583 | A1 | 3/2011 | Imai et al. | |
| 2011/0205919 | A1* | 8/2011 | Imai | H04L 45/127 370/252 |
| 2012/0075995 | A1 | 3/2012 | Welin et al. | |
| 2012/0263062 | A1* | 10/2012 | Matsubara | H04L 45/10 370/252 |

FOREIGN PATENT DOCUMENTS

| CN | 101841482 A | 9/2010 |
| EP | 2 043 311 A1 | 4/2009 |
| JP | 2010-148023 A | 7/2010 |
| WO | WO 2010/144001 A1 | 12/2010 |

OTHER PUBLICATIONS

Yunfei Shang, Dan Li, Mingwei Xu, "Energy-aware Routing in Data Center Network," Proceedings of ACM SIGCOMM 2010 Workshop on Green Networking.

Nick McKeown, et al., "OpenFlow: Enabling Innovation in Campus Networks," [online], [search conducted Mar. 30, 2011] Internet URL:http://www.openflowswitch.org//documents/openflow-wp-latest.pdf.

Y. Honma, M. Aida, H. Shimonishi and A. Iwata, "A New Multi-path Routing Methodology Based on Logit Type Assignment," Proceedings of the 2nd International Workshop on the Network of the Future (FutureNet II), 2009.

Yusuke Shinohara et al., "Automatic Parameter Setting Mechanism Minimizing Path Cost on MLB Routing" IEICE Technical Report vol. 110 No. 448, Feb. 24, 2011, pp. 411-416.

Chinese Office Action dated May 15, 2015 with an English translation thereof.

Extended European Search Report dated Aug. 11, 2014.

* cited by examiner

FORWARDING PROBABILITY TABLE 30-i FOR TARGET NODE 5-i

| DESTINATION NODE | NEXT HOP NODE | FORWARDING PROBABILITY |
|---|---|---|
| 5-1 | 5-i1(1) | Pi1(1) |
| | 5-i1(2) | Pi1(2) |
| ... | ... | ... |
| 5-j (j=1~n; j≠i) | 5-ij(1) | Pij(1) |
| | 5-ij(k) | Pij(k) |
| | 5-ij(m) | Pij(m) |
| ... | ... | ... |
| 5-n | | |

CONTROL SERVER, NETWORK CONTROL METHOD, AND PROGRAM

TECHNICAL FIELD

Reference to Related Application

This application is based upon and claims the benefit of the priority of Japanese patent application No. 2011-082887, filed on Apr. 4, 2011, the disclosure of which is incorporated herein in its entirety by reference thereto.

This invention relates to a control server, a network control method, and a program, and in particular relates to a control server, a network control method, and a program, that control a power supply of a node disposed in a network, while maintaining communication capability in the network.

BACKGROUND

Communication systems are known in which a communication network including a plurality of nodes is managed centrally by a management server. On receiving a request to set a path related to traffic, the management server determines a communication path for the traffic in question in the communication network. In the following, a management server that determines the communication path for traffic is referred to as a "control server."

In a communication network that includes a plurality of nodes, a power supply for the nodes is always in an ON state, in preparation for the generation of traffic. This type of power supply management method is effective in an environment with a high frequency of traffic occurrence. However, in an environment with a low frequency of traffic occurrence, the node usage rate is low, the nodes are not used effectively, and electrical power is consumed unnecessarily in the communication network.

To reduce the power consumption of a communication network in an environment with a low frequency of traffic generation, it is preferable to shut off the power supply of nodes with a low rate of usage, or to go into a power saving mode. Furthermore, in this case it is necessary not to reduce throughput provided for traffic. In an environment with a low frequency of traffic generation, as an example, the following technology is known for shutting off the power supply of nodes with a low rate of usage or for going into a power saving mode, while providing adequate throughput for traffic.

PTL 1 describes a method in which traffic volume is measured at an edge portion of a communication network, and if the traffic volume is low, nodes are transitioned to a power saving mode and routing is performed to circumvent the nodes that have transitioned to the power saving mode.

NPL 1 describes an energy-aware routing method where, with a state in which there is input from all power supplies as an initial state, path calculation for equal-cost multi-path is performed, estimated average throughput of traffic in the initial state and estimated node usage rate are calculated, the power supply of nodes having the lowest estimated node usage rate is shut off, and power supply shutoff and comparison of estimated average throughput are performed until the estimated average throughput of the traffic in a network, in which nodes that have power supply shut off are removed, is not greater than a fixed number of times the estimated average throughput in the initial state. According to this method, it is possible to shut off the power supply of nodes with low rates of usage while maintaining throughput.

PTL 1:
 Japanese Patent Kokai Publication No. JP-P2010-148023A
NPL 1:
 Yunfei Shang, Dan Li, Mingwei Xu, "Energy-aware Routing in Data Center Network," Proceedings of ACM SIGCOMM 2010 Workshop on Green Networking.
NPL 2:
 Nick McKeown, et al., "OpenFlow: Enabling Innovation in Campus Networks," [online], [search conducted Mar. 30, 2011] Internet URL:
 http://www.openflowswitch.org//documents/openflow-wp-latest.pdf
NPL 3:
 Y. Honma, M. Aida, H. Shimonishi and A. Iwata, "A New Multi-path Routing Methodology Based on Logit Type Assignment," Proceedings of the 2nd International Workshop on the Network of the Future (FutureNet II), 2009.

SUMMARY

The entire disclosures of above cited literatures are incorporated herein by reference thereto.

The following analysis has been carried out by the inventors of the present invention.

In a communication network that includes a plurality of nodes, a power supply of the nodes is always in an ON state, in preparation for the generation of traffic. However, in an environment with a low frequency of traffic generation, the node usage rate is low, the nodes are not used effectively, and electrical power is consumed unnecessarily in the communication network. In order to effectively use the network, in an environment with a low frequency of traffic occurrence it is preferable to shut off the power supply of nodes with a low rate of usage, or to go into a power saving mode.

However, since power control technology described in PTL 1 does not give consideration to routing, it is difficult to effectively select nodes to be shut off.

Furthermore, according to a method described in NPL 1, since a determination is made as to whether or not to stop power shutoff based on a relative indicator, there may be cases where it is not possible to provide adequate throughput for traffic or where the power supply of more nodes than necessary is in an ON state. For example, although adequate throughput cannot be provided for the traffic even when the power supply of all the nodes is in an ON state, the power supply of a node might be shut off.

Thus, there is a need to reduce the power consumption of a communication network while providing adequate throughput for traffic.

According to a first aspect of the present disclosure, there is provided a control server, comprising:
 a node selection unit that selects part of nodes included in a first communication network and generates a second communication network from the selected nodes;
 a link cost calculation unit that determines a forwarding probability of a packet between a node and its next hop node in the second communication network to calculate a communication volume between at least one pair of nodes included in the second communication network with respect to a prescribed traffic using the determined forwarding probability, and calculate a link cost for at least one pair of nodes included in the second communication network based on the determined forwarding probability and the calculated communication volume;
 a node addition unit that adds at least one node that is included in the first communication network but is not included in the second communication network to the second communication network so that the calculated link cost satisfies a prescribed condition; and a node control unit that puts at least one node included in the second communication network in a first mode, and the other node(s) in a second mode with a lower power consumption than the first mode.

According to a second aspect of the present disclosure, there is provided a network control method, comprising:

selecting part of nodes included in a first communication network and generating a second communication network from the selected nodes; determining a forwarding probability of a packet between a node and its next hop node in the second communication network to calculate a communication volume between at least one pair of nodes included in the second communication network with respect to a prescribed traffic using the determined forwarding probability, and calculate a link cost for at least one pair of nodes included in the second communication network based on the determined forwarding probability and the calculated communication volume;

adding a node that is included in the first communication network but is not included in the second communication network to the second communication network;

repeating the determining and the adding, until the calculated link cost satisfies a prescribed condition; and putting at least one node included in the second communication network in a first mode, and the other node(s) in a second mode with a lower power consumption than the first mode.

According to a third aspect of the present disclosure, there is provided a program, that causes a computer to execute:

selecting part of nodes included in a first communication network and generating a second communication network from the selected nodes;

determining a forwarding probability of a packet between a node and its next hop node in the second communication network to calculate a communication volume between at least one pair of nodes included in the second communication network with respect to a prescribed traffic using the determined forwarding probability, and calculate a link cost for at least one pair of nodes included in the second communication network based on the determined forwarding probability and the calculated communication volume;

adding a node that is included in the first communication network but is not included in the second communication network to the second communication network;

repeating the determining and the adding, until the calculated link cost satisfies a prescribed condition; and putting at least one node included in the second communication network in a first mode, and the other node(s) in a second mode with a lower power consumption than the first mode.

The program may be recorded and embodied on a recording medium which computer-readable and non-transient.

The present invention provides the following advantage, but not restricted thereto. According to the control server, the network control method, and the program, of the present disclosure, it is possible to reduce the power consumption of a communication network, while providing adequate throughput for traffic.

PREFERRED MODES

In the present disclosure, there are various possible modes, which include the following, but not restricted thereto. First, a description is given of an outline of an exemplary embodiment. It is to be noted that that reference symbols in the drawings attached to this outline are examples solely for the purpose of assisting understanding, and are not intended to limit the present disclosure to modes illustrated in the drawings.

Figure 6:
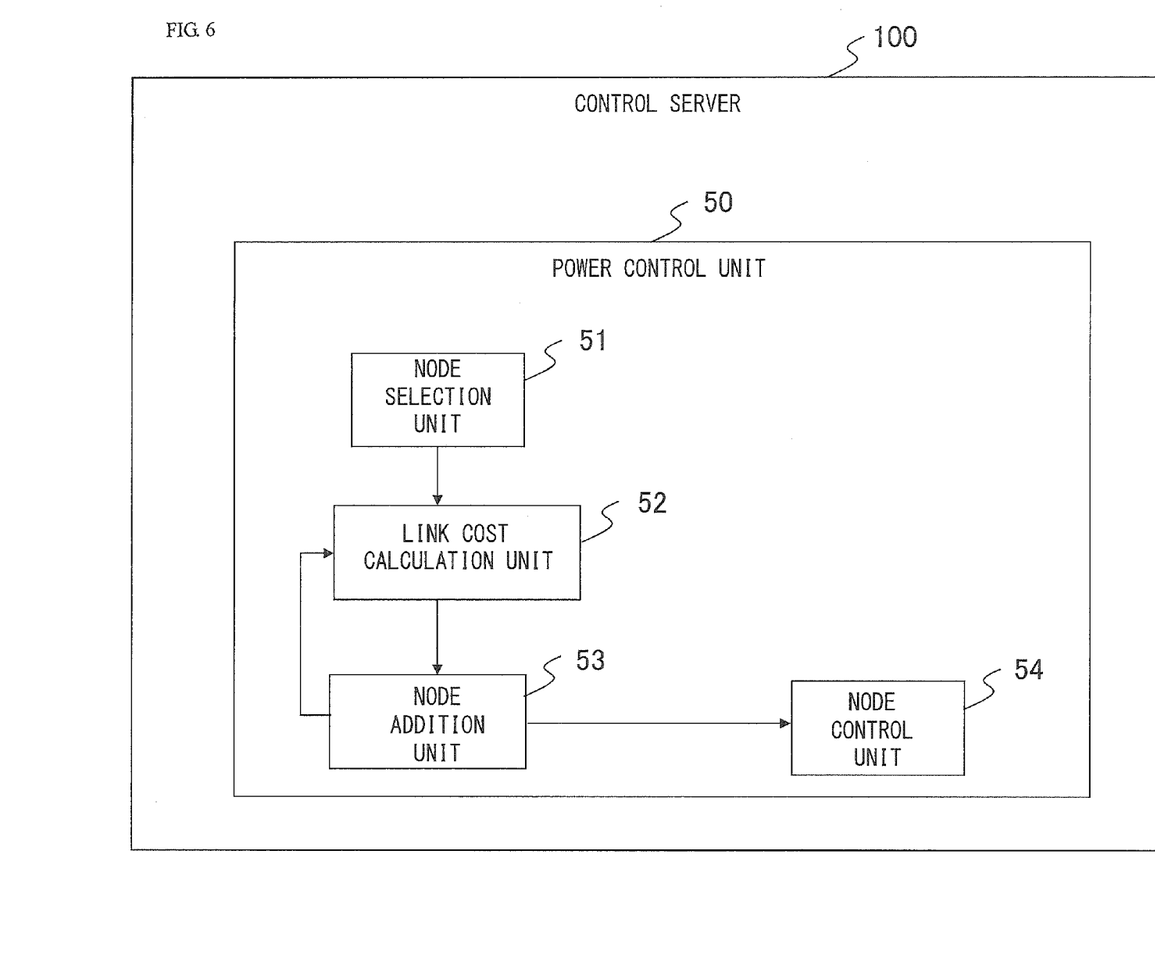
FIG. 6 is a block diagram showing a configuration of a power control unit of the control server according to the exemplary embodiment.

Referring to FIG. 6, a control server (100) may comprise: a node selection unit (51) that selects part of nodes included in a first communication network and generates a second communication network from the selected nodes; a link cost calculation unit (52) that determines a forwarding probability of a packet between a node and its next hop node in the second communication network to calculate communication volume between at least one pair of nodes included in the second communication network with respect to a prescribed traffic using the determined forwarding probability, and calculate a link cost for at least one pair of nodes included in the second communication network based on the determined forwarding probability and the calculated communication volume; a node addition unit (53) that adds at least one node that is included in the first communication network but is not included in the second communication network to the second communication network so that the calculated link cost satisfies a prescribed condition; and a node control unit (54) that puts at least one node included in the second communication network in a first mode, and the other node(s) in a second mode with a lower power consumption than the first mode.

The node addition unit (53) may judge that the prescribed condition is satisfied in a case where a maximum value of link costs for at least one pair of nodes included in the second communication network is less than a prescribed threshold.

Furthermore, the node addition unit (53) may determine a forwarding probability between a node and its next hop node in the first communication network, calculate a communication volume between at least one pair of nodes included in the first communication network with respect to the prescribed traffic using the determined forwarding probability, calculate a communication volume for each node included in the first communication network based on the calculated communication volume, and add at least one node with a maximum communication volume to the second communication network. Meanwhile, the node addition unit (53) may determine a forwarding probability of a packet between a node and its next hop node in the first communication network, calculate a communication volume between at least one pair of nodes included in the first communication network with respect to the prescribed traffic using the determined forwarding probability, calculate link costs of at least one pair of nodes included in the first communication network based on the determined forwarding probability and the calculated communication volume, and add a node for which sum of link costs of at least one pair of nodes including the node itself is maximum, to the second communication network.

The link cost calculation unit (52) may acquire a transmitted data volume or received data volume at least one edge node with respect to the prescribed traffic, and use the acquired transmitted data volume or the received data volume and the determined forwarding probability to calculate a communication volume between at least one pair of nodes included in the second communication network with respect to the prescribed traffic.

Furthermore, the node selection unit (51) may select all edge nodes from the first communication network, and may select nodes along a shortest path connecting all pairs of edge nodes (i.e. every pair of any one edge node and any other edge node).

In addition, the node control unit (54) may shut off the power supply of nodes not included in the second communication network.

The control server according to the present disclosure configures the second network by extracting nodes necessary for providing adequate throughput for the traffic, from among nodes included in the first network, and also curtails power consumption of nodes not included in the second network. In this way it becomes possible to reduce the power consumption of the communication network while providing adequate throughput for traffic.

The following modes are possible in the present invention.

(Mode 1)
There is provided a control server according to the first aspect.

(Mode 2)
The node addition unit may judge that the prescribed condition is satisfied in a case where a maximum value of link costs for at least one pair of nodes included in the second communication network is less than a prescribed threshold.

(Mode 3)
The node addition unit may determine a forwarding probability of a packet between a node and its next hop node in the first communication network, calculate a communication volume between at least one pair of nodes included in the first communication network with respect to the prescribed traffic using the determined forwarding probability, calculate a communication volume for each node included in the first communication network based on the calculated communication volume, and add a node with a maximum communication volume to the second communication network.

(Mode 4)
The node addition unit may determine a forwarding probability of a packet between a node and its next hop node in the first communication network, calculate a communication volume between at least one pair of nodes included in the first communication network with respect to the prescribed traffic using the determined forwarding probability, calculate link costs of at least one pair of nodes included in the first communication network based on the determined forwarding probability and the calculated communication volume, and add a node for which sum of link costs of a pair of nodes including the node itself is maximum, to the second communication network.

(Mode 5)
The link cost calculation unit may acquire a transmitted data volume or received data volume at an edge node with respect to the prescribed traffic, and use the acquired transmitted data volume or the received data volume and the determined forwarding probability to calculate a communication volume between at least one pair of nodes included in the second communication network with respect to the prescribed traffic.

(Mode 6)
The node selection unit may select all edge nodes from the first communication network, and may select node(s) in the shortest path linking all pairs (every pair) of edge nodes.

(Mode 7)
The node control unit may shut off power supply of a node(s) not included in the second communication network.

(Mode 8)
There is provided a communication system comprising the first communication network and the control server as described in any one or any combination of the above modes.

(Mode 9)
There is provided a network control method according to the second aspect.

(Mode 10)
The prescribed condition may be satisfied in a case where a maximum value of link costs for at least one pair of nodes included in the second communication network is less than a prescribed threshold.

(Mode 11)
A network control method may comprise: determining a forwarding probability of a packet between a node and its next hop node in the first communication network; calculating a communication volume between at least one pair of nodes included in the first communication network with respect to the prescribed traffic using the determined forwarding probability; calculating a communication volume for each node included in the first communication network based on the calculated communication volume; and adding a node with a maximum communication volume to the second communication network.

(Mode 12)
The network control method may comprise: determining a forwarding probability of a packet between a node and its next hop node in the first communication network; calculating a communication volume between at least one pair of nodes included in the first communication network with respect to the prescribed traffic using the determined forwarding probability; calculating link costs of at least one pair of nodes included in the first communication network based on the determined forwarding probability and the calculated communication volume; and adding a node for which sum of link costs of at least one pair of nodes including the node itself is maximum, to the second communication network.

(Mode 13)
The network control method may comprise: acquiring a transmitted data volume or a received data volume at an edge node with respect to the prescribed traffic; and using the acquired transmitted data volume or the received data volume and the determined forwarding probability to calculate a communication volume between at least one pair of nodes included in the second communication network with respect to the prescribed traffic.

(Mode 14)
There is provided a program according to the third aspect.

(Mode 15)
In the program, the prescribed condition may be satisfied in a case where a maximum value of link costs for at least one pair of nodes included in the second communication network is less than a prescribed threshold.

(Mode 16)

The program may cause a computer to execute: determining a forwarding probability of a packet between a node and its next hop node in the first communication network; calculating a communication volume between at least one pair of nodes included in the first communication network with respect to the prescribed traffic using the determined forwarding probability; calculating the communication volume for each node included in the first communication network based on the calculated communication volume; and adding a node with a maximum communication volume to the second communication network.

(Mode 17)

The program may cause a computer to execute: determining a forwarding probability of a packet between a node and its next hop node in the first communication network; calculating a communication volume between at least one pair of nodes included in the first communication network with respect to the prescribed traffic using the determined forwarding probability; calculating link costs of at least one pair of nodes included in the first communication network based on the determined forwarding probability and the calculated communication volume; and adding a node for which sum of link costs of node pairs including the itself is maximum, to the second communication network.

(Mode 18)

The program may cause a computer to execute: acquiring a transmitted data volume or a received data volume at an edge node with respect to the prescribed traffic; and using the acquired transmitted data volume or the received data volume and the determined forwarding probability to calculate communication volume between at least one pair of nodes included in the second communication network with respect to the prescribed traffic.

(Mode 19)

There is provided a computer readable recording medium that stores the program described above, and may be non-transient.

(Mode 20)

There is provided a node power control method wherein:
in a path selection method for controlling a network, in which a plurality of paths exist from source(s) to destination(s), based on the network and a forwarding probability of traffic between nodes, assuming a state, in which nodes along paths connecting all source and destination pairs are activated, as an initial state of a network configured by nodes to be activated;
determining a forwarding probability of traffic between nodes in the network configured by nodes to be activated;
using the forwarding probability and a communication volume assumed to occur in the future to estimate a future link cost of the network;
adding at least one node that is most used when activated to the network configured by nodes to be activated, until the cost goes below a threshold; and
when the cost goes below the threshold, activating nodes included in the network configured by nodes to be activated, and the power supply of nodes not included in the network configured by nodes to be activated is shut off.

(Mode 21)

In the node power control method, the state in which nodes along paths connecting all source-and-destination-pairs are activated may be a state in which nodes along a shortest path among paths connecting all source and destination pairs.

(Mode 22)

The node power control method may comprise estimating a future link cost of all links in a network configured by activated nodes, based on a communication volume assumed to occur in the future in all pairs (every pair) of nodes and a forwarding probability of traffic between nodes in the network configured by the activated nodes.

(Mode 23)

In the node power control method, the communication volume assumed to occur in the future may be a communication volume of all pairs of nodes (every pair of nodes) obtained from an edge switch, by which a traffic path is managed and through which the traffic goes.

(Mode 24)

The node power control method may comprise estimating future link costs of all links based on a communication volume assumed to be generated in the future in all pairs (every pair) of nodes and a forwarding probability of traffic between nodes in a network configured by all nodes, wherein a node most used when activated may be a node having the highest total link cost value among nodes not activated.

(Exemplary Embodiment)

Figure 1:
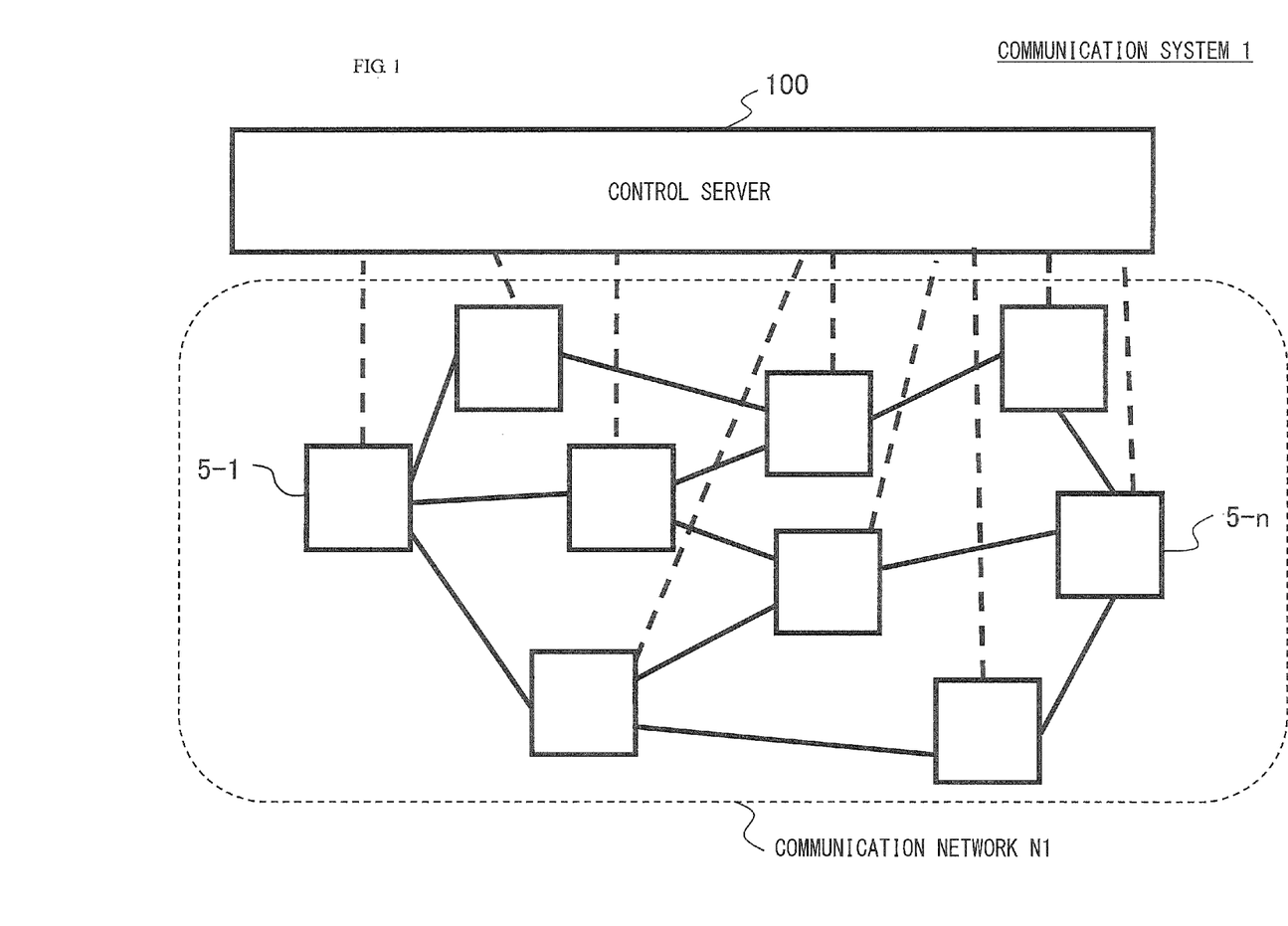
FIG. 1 is a diagram schematically showing a communication system provided with a control server according to an exemplary embodiment.

A description is given concerning a communication system according to an exemplary embodiment, making reference to the drawings. FIG. 1 is a diagram schematically showing the communication system 1 according to the present exemplary embodiment. Referring to FIG. 1, the communication system 1 is provided with a communication network N1 including a plurality of nodes, and a control server 100. The communication network N1 includes n nodes 5-1 to 5-n (n is an integer not less than two).

When a traffic communication path is determined, the control server 100 instructs each node 5-i along the determined communication path that traffic data (packets, frame data, or the like) be forwarded along the determined communication path. Each node 5-i performs self-setting according to an instruction from the control server 100.

Each node 5-i is provided with, for example, a forwarding table. Here, the forwarding table is a table indicating correspondence relationships between traffic input source and destination. Each node 5-i forwards traffic obtained from the input source to the destination as instructed, by making reference to the forwarding table. In this case, the control server 100 instructs each node 5-i that the forwarding table be set so that the traffic is forwarded along the determined communication path. Each node 5-i sets content for its own forwarding table, according to the instruction from the control server 100.

As an interface system between the control server 100 and the nodes 5-i for realizing this processing, technology referred to as OpenFlow is proposed in NPL 2, the entire disclosure there of being incorporated herein by reference thereto. OpenFlow takes communication as flow, and path control, recovery from failure, load balancing, and optimization are performed in flow units. An OpenFlow switch that functions as a node is provided with a secure channel for communication with an OpenFlow controller functioning as a control server, and operates according to a flow table indicated by appropriate addition or rewriting from the OpenFlow controller. In the flow table are definitions of a set(s) of rules for collation with packet headers, actions defining processing content(s), and flow statistical information, for each flow.

For example, when an OpenFlow switch receives a first packet, an entry is searched for that has a rule (FlowKey) matching header information of the received packet, from the flow table. In a case where an entry matching the received packet is found, the OpenFlow switch implements processing content described in an Actions field of the entry in question, for the received packet. On the other hand, in a case where an entry matching the received packet is not found, the OpenFlow switch forwards the received packet to the OpenFlow controller via a secure channel, requests determination of a path of the packet based on source and destination of the received packet, receives a flow entry for realizing this, and updates the flow table.

Figure 2:
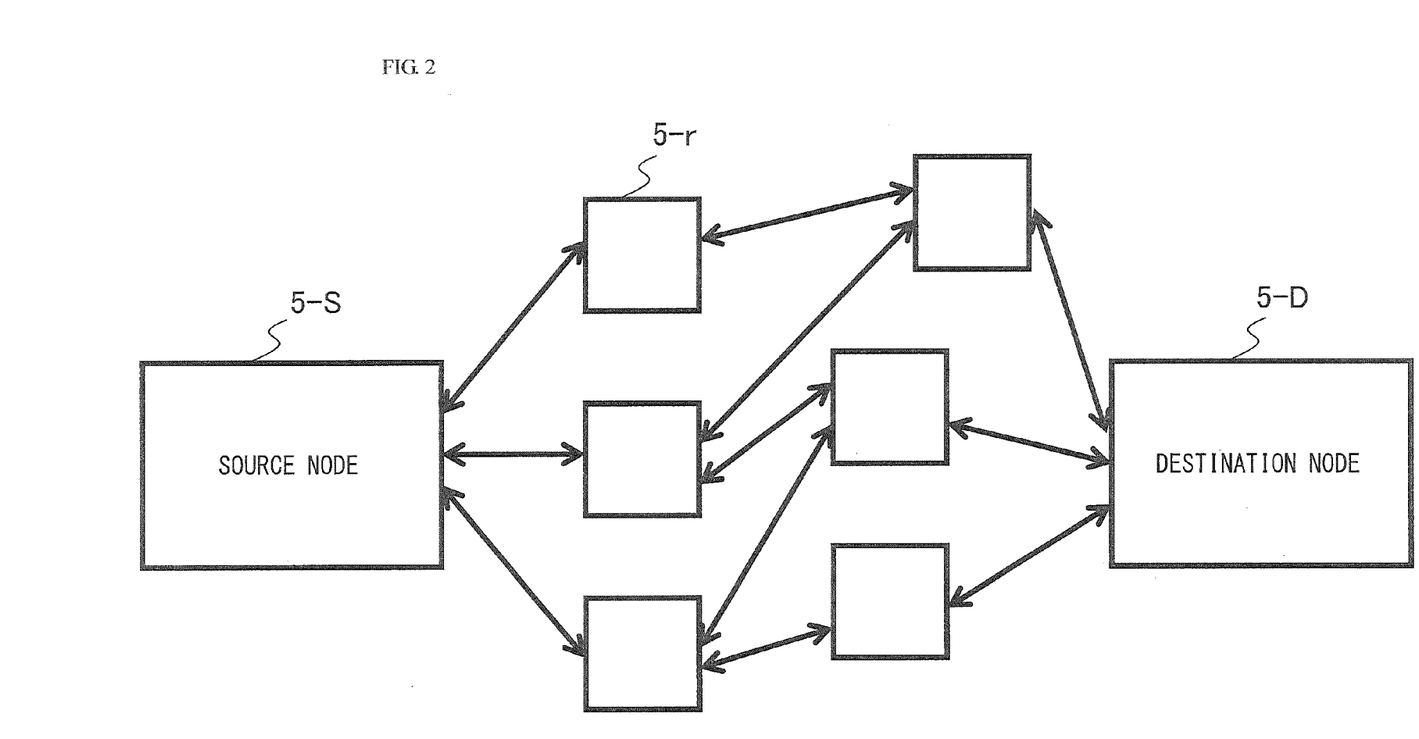
FIG. 2 is a conceptual diagram showing a communication path from a source node to a destination node.

FIG. 2 is a conceptual diagram showing a plurality of communication paths from a source node 5-S to a destination node 5-D. As shown in FIG. 2, in many cases there exist a plurality of possible communication paths from the source node 5-S to the destination node 5-D. Each communication path includes several relay nodes 5-r, and different communication paths are formed of a variety of possible combinations of different relay nodes 5-r.

Figure 3:
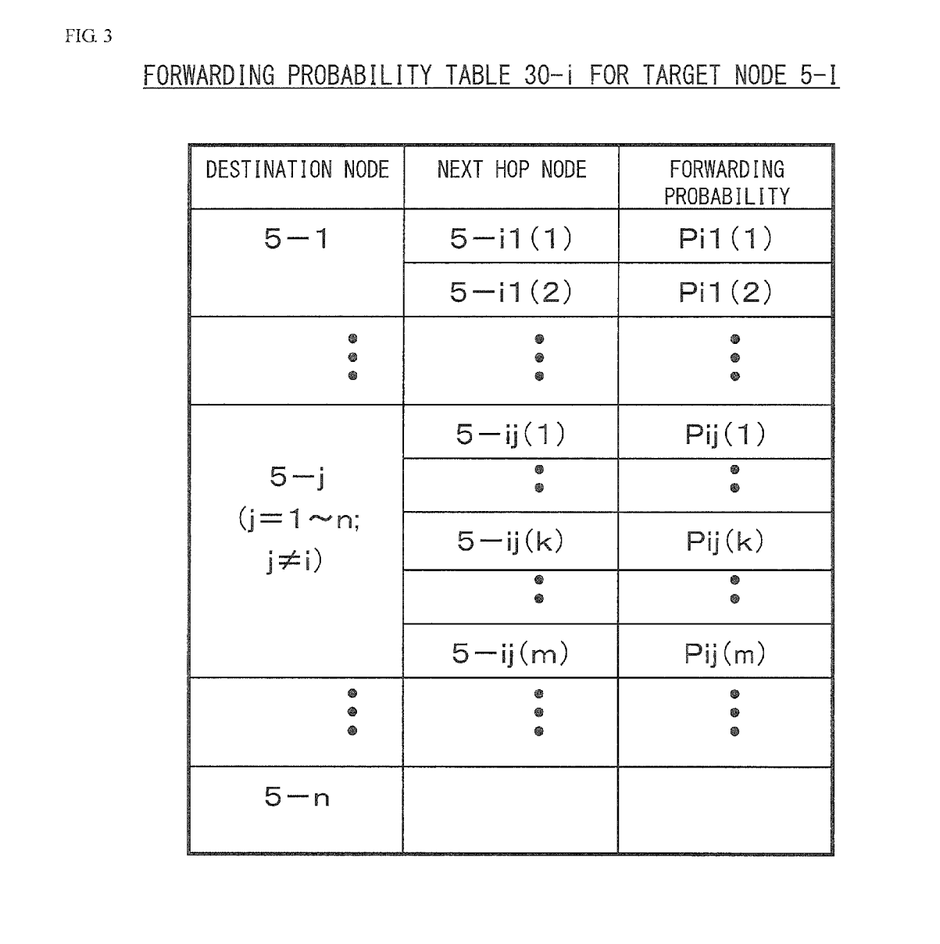
FIG. 3 is a diagram showing a forwarding probability table for a control server according to the exemplary embodiment.

Based on network information including link cost and topology information from the communication network, it is possible to form a forwarding probability table. A description is given concerning the forwarding probability table, making reference to the drawings. FIG. 3 is a diagram showing an example of the forwarding probability table 30-i with respect to a target node 5-i (i=1 to n), where n is an integer of at least 2.

Here, the target node 5-i (i=1 to n) represents any of nodes 5-1 to 5-n in FIG. 1. Furthermore, a destination node 5-j (j=1 to n, j not equal to i) refers to any of nodes 5-1 to 5-n, except for the target node 5-i.

Now, consider a traffic to be transmitted from the target node 5-i to the destination node 5-j. In this case, a next node that is a destination for traffic from the node 5-i is a "next hop node 5-ij". That is, the next hop node 5-ij is a node of a next hop, with respect to the node 5-i through which the traffic passes. For the target node 5-i, a plurality of next hop nodes 5-ij may exist. If there are m (m is a natural number) next hop node candidates, these can be expressed as 5-ij(1) to 5-ij(m). That is, for the target node 5-i, there exist 5-ij(k) (k=1 to m) next hop node candidates. It is to be noted that the next hop node candidates 5-ij(k) may be any node that tends towards being more remote from the source node 5-j.

In the above way, the forwarding probability table 30 represents "next hop information" indicating next hop node candidates. Forwarding probability tables 30-1 to 30-n are provided for each of nodes 5-1 to 5-n. That is, the target node 5-i and the forwarding probability table 30-i are associated with one another, and the forwarding probability table 30-i indicates a next hop node candidate 5-ij(k) related to the target node 5-i.

Referring to FIG. 3, the forwarding probability table 30-i indicates the next hop node candidate 5-ij for each destination node 5-j (j=1 to n, j not equal to i). In addition, the forwarding probability table 30-i indicates the forwarding probability Pij(k) specified with regard to respective next hop node candidates 5-ij(k). The forwarding probability Pij(k) represents the probability that the next hop node 5-ij(k) will be selected from among the m next hop node candidates 5-ij(1) to 5-ij(m).

The control server 100 forwards traffic probabilistically based on the forwarding probability table 30.

It is to be noted that the control server 100 may implement the abovementioned path setting processing by executing a path setting program. In addition, the path setting program may be a computer program executed by the control server 100, and may be recorded on a computer-readable recording medium, which may e non-transient.

Figure 4:
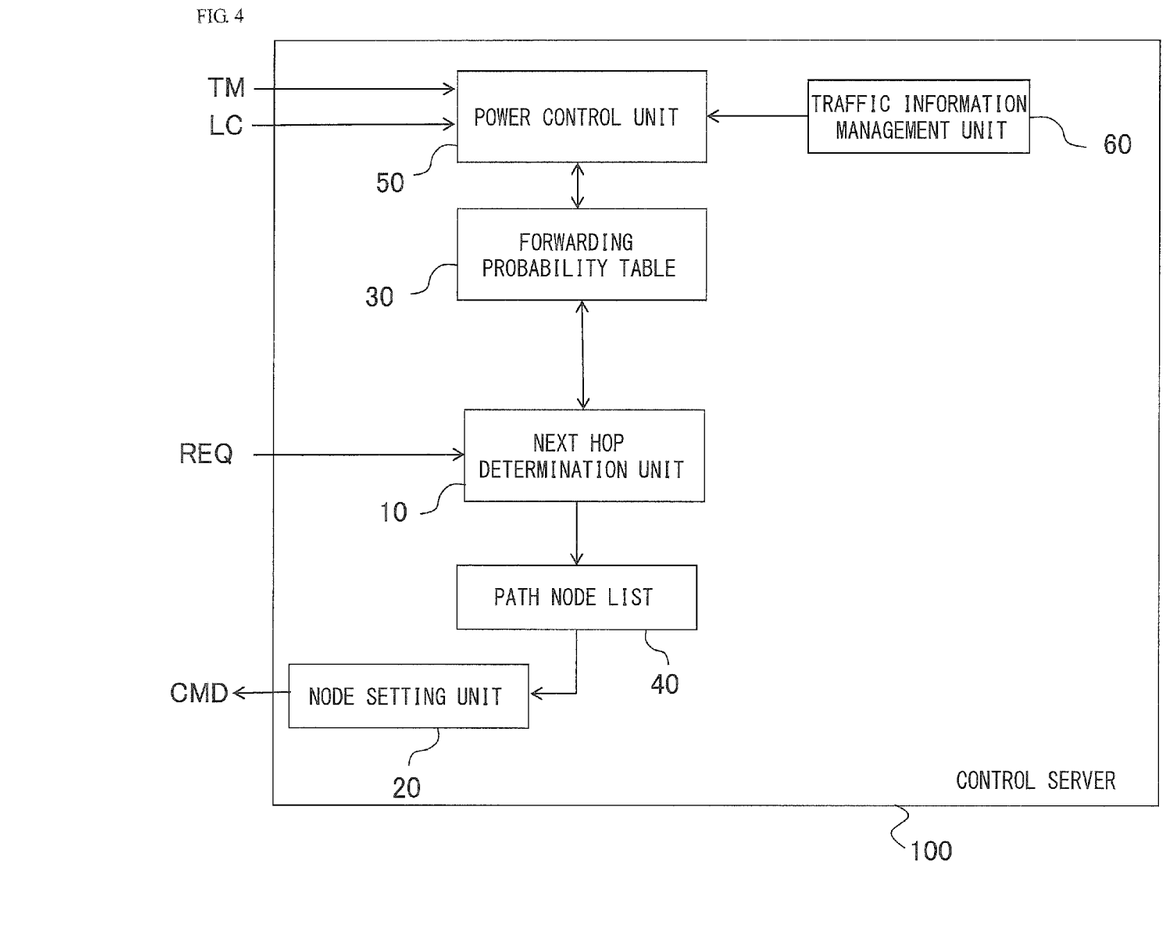
FIG. 4 is a block diagram showing a configuration of the control server according to the exemplary embodiment.

FIG. 4 is a block diagram showing an example of a configuration of the control server 100. Making reference to FIG. 4, the control server 100 is provided with a next hop determination unit 10, a node setting unit 20, a forwarding probability table 30, a path node list 40, a power control unit 50, and a traffic information management unit 60.

The next hop determination 10 obtains next hop node candidates for a target node and the forwarding probability for each candidate from the forwarding probability table 30, and selects one node from the next hop node candidates. Furthermore, the next hop determination unit 10 updates the target node to the one next hop node that was selected, and adds this to the path node list 40.

The power control unit 50 determines a node for which a power supply is shut off or a power saving mode applies, in order to reduce power.

The power control unit 50 obtains edge nodes through which traffic passes from the traffic information management unit 60, in order to comprehend the communication volume between all pairs of nodes (i.e., between every pair of nodes).

Figure 5:
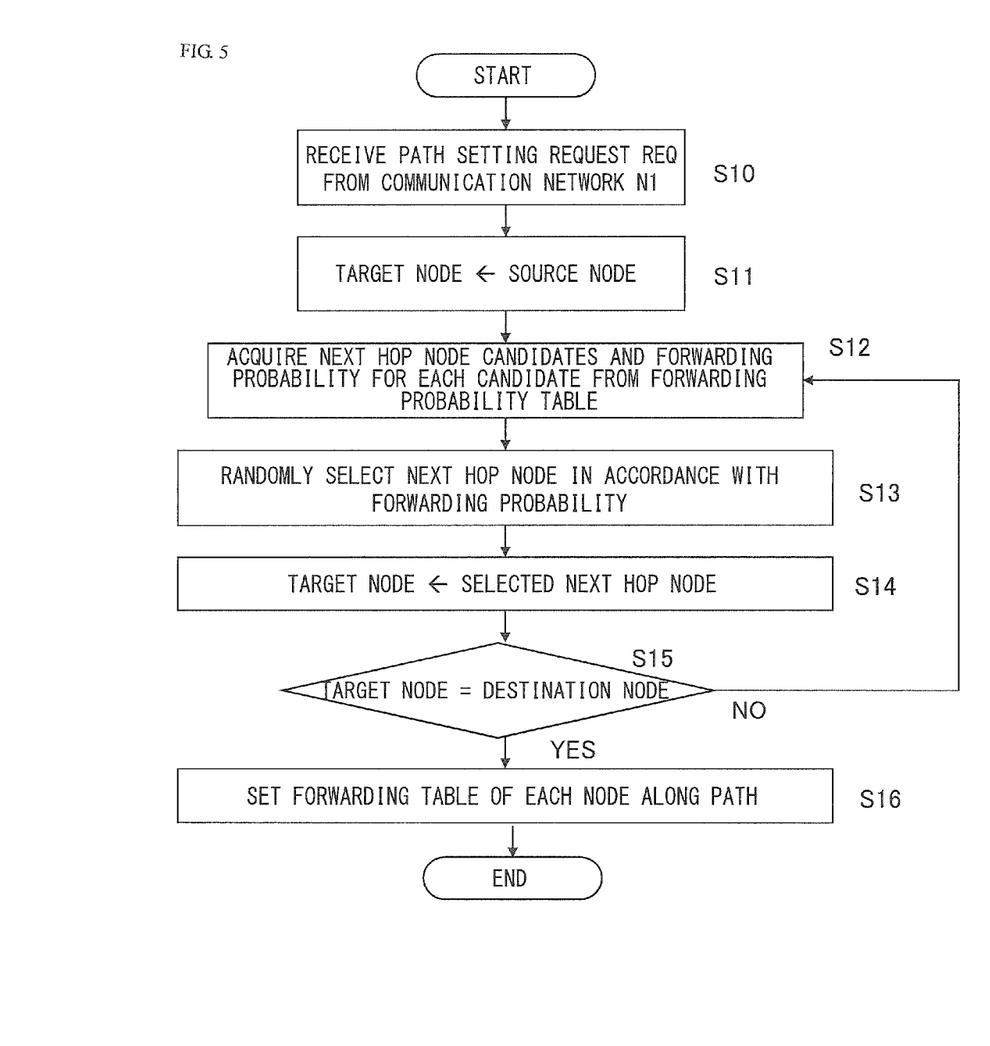
FIG. 5 is a flow chart showing operations of a next hop determination unit and a node setting unit of the control server according to the exemplary embodiment.

Next, a description is given concerning path setting processing according to the present exemplary embodiment, making reference to the drawings. FIG. 5 is a flow chart showing an example of the path setting processing by the next hop determination unit 10.

When traffic occurs, the next hop determination unit 10 receives a path setting request REQ with regard to the traffic in question from the communication network N1 (step S10). The path setting request REQ indicates a source node 5-S and a destination node 5-D for the traffic in question.

The next hop determination unit 10 receives the path setting request REQ and recognizes the source node 5-S and the destination node 5-D. The next hop determination unit 10 then sets the source node 5-S as an initial value of the target node 5-i (step S11).

The next hop determination unit 10 refers to a row where the destination node 5-j is 5-D, in the forwarding probability table 30-i associated with the target node 5-i, and obtains next hop node candidates and a forwarding probability for each of the candidates (step S12).

The next hop determination unit 10 obtains the next hop candidates and the forwarding probability from the forwarding probability table 30-i, and randomly selects one next hop node 5-ij from among the next hop node candidates 5-ij(1) to 5-ij(m) (step S13). For example, the next hop determination unit 10 uses a random number and the forwarding probability Pij(k). Here, the total (sum) of the forwarding probability values need not be one.

As an example, a case may be considered where the number of next hop nodes is three (m=3), and the forwarding probabilities Pij(1) to Pij(3) of the next hop node candidates 5-ij(1) to 5-ij(3) are respectively 0.2, 0.3, and 0.6. In this case, with regard to the next hop node candidates 5-ij(1) to 5-ij(3), numerical ranges are specified in accordance with respective forwarding probabilities Pij(1) to Pij(3) thereof. For example, the next hop determination unit 10 associates a range not less than 0 and less than 0.2 with the next hop node candidate 5-ij(1), a range not less than 0.2 and less than 0.5 with the next hop node candidate 5-ij(2), and a range not less than 0.5 and less than 1.1 with the next hop node candidate 5-ij(3). In a case where the total of the forwarding probability values is not one, the next hop determination unit 10 generates a uniform random number X in a range of not less than 0 and less than the total (sum) of the forwarding probability values. The next hop determination unit 10 selects a next hop node candidate associated with a numerical range including the generated random number X. For example, in a case where the generated random number X is 0.3, the next hop determination unit 10 selects the next hop node candidate 5-ij(2). In this way, the next hop determination unit 10 randomly selects one next hop node 5-ij in accordance with the forwarding probability Pij(k).

On selecting the next hop node 5-ij, the next hop determination unit 10 holds the selected next hop node 5-ij in a path node list 40 as an relay node 5-r. Moreover, the next hop determination unit 10 updates the target node 5-i to the selected next hop node 5-ij (step S14).

When the next hop determination processing is completed, the next hop determination unit 10 checks whether or not the target node 5-i after updating (that is, the selected next hop node) matches the destination node 5-D (step S15). That is, the next hop determination unit 10 checks whether or not the target node 5-i has reached the destination node 5-D.

In a case where the target node 5-i has not reached the destination node 5-D (NO in step S15), processing returns to step S12, and the next hop determination unit 10 executes next hop determination processing related to the target node 5-i once again.

By repeating the abovementioned processing (steps S12 to S15), the next hop determination unit 10 randomly determines relay nodes 5-r one hop at a time (i.e., one hop by one hop), from the source node 5-S towards the destination node 5-D.

Finally, the target node 5-i reaches the destination node 5-D (YES in step S15), whereupon, the communication path from the source node 5-S to the destination node 5-D is determined. As described above, the next hop determination unit 10 randomly determines a communication path from the source node 5-S to the destination node 5-D one hop by one hop, by repeating next hop determination processing.

When the communication path is determined by the next hop determination unit 10 (YES in step S15), the node setting unit 20 gives an instruction to each node 5 in the determined communication path to forward the traffic along the determined communication path (step S16). The node setting unit 20 transmits a forwarding table setting command CMD to each node 5-i registered in the path node list 40. Here, the forwarding table setting command CMD is a command that gives an instruction to set the forwarding table so that the traffic is forwarded along the determined communication path.

Each node 5 in the determined communication path receives the forwarding table setting command CMD from the control server 100, and sets content of its own forwarding table according to the forwarding table setting command CMD. From the above, the traffic data is transmitted from the source node 5-S to the destination node 5-D.

It is to be noted that a description has been given concerning a path setting method according to centralized control, but it is also possible to use a path setting method according to distributed control.

Next, a description is given concerning a power control method by the power control unit 50, making reference to the drawings. FIG. 6 is a block diagram showing a configuration of the power control unit 50. Referring to FIG. 6, the power control unit 50 is provided with a node selection unit 51, a link cost calculation unit 52, a node addition unit 53, and a node control unit 54.

The node selection unit 51 selects some (part of) nodes from nodes included in a first communication network N1 (for example, a network including all nodes), and generates a second communication network N2 formed from the selected nodes. The link cost calculation unit 52 determines the forwarding probability of a packet between a node and its next hop node, in the second communication network N2, calculates the communication volume between node pairs included in the second communication network N2 for prescribed traffic using the obtained forwarding probability, and calculates the link cost at least one pair of nodes included in the second communication network based on the determined forwarding probability and the calculated communication volume. The node addition unit 53 adds a node included in the first communication network N1 but not included in the second communication network N2 to the second communication network N2, so that the calculated link cost satisfies a prescribed condition. The node control unit 54 puts a node included in the second communication network N2 in a first mode (for example, a normal power consumption mode) and nodes other than of this in a second mode (for example, a low power consumption mode or an inactive mode) that has a lower power consumption than the first mode.

In the present exemplary embodiment, at least one node to be activated is added to the communication network N2 configured by activated node(s). Furthermore, at least one node included in the communication network N2 is activated, and the power supply of nodes not included in the communication network N2 is shut off or put in a power saving mode.

A state where all nodes in the shortest path extending over a pair of (between) a source and destination are activated is an initial state of the communication network N2; the forwarding probability table 32 (not shown in the drawings) of the communication network N2 is built; and a future link cost LC2' of the communication network N2 is estimated based on the forwarding probability table 32 and the communication volume between all nodes. In a case where the maximum value of the estimated future link cost LC2' is not less than a threshold TH, in order to reduce this the forwarding probability table 31 (not shown in the drawings) is built with regard to the communication network N1 configured by all nodes, which is a network where all nodes in the network are activated, and nodes that have the highest utilization rate among nodes not activated are added to the communication network N2. Once again, the forwarding probability table 32 of the communication network N2 is built, the future link cost LC2' is estimated based on the forwarding probability table 32 and the communication volume between all pairs (every pair) of nodes, and addition of node(s) to the communication network N2 and estimation of the future link cost LC2' are repeated until the estimated future link cost goes below the threshold TH. In a case where the estimated future link cost LC2' goes below the threshold TH, the nodes included in the communication network N2 are activated, and the power supply of (to) node(s) not included in the communication network N2 is shut off or put in a power saving mode.

Figure 7:
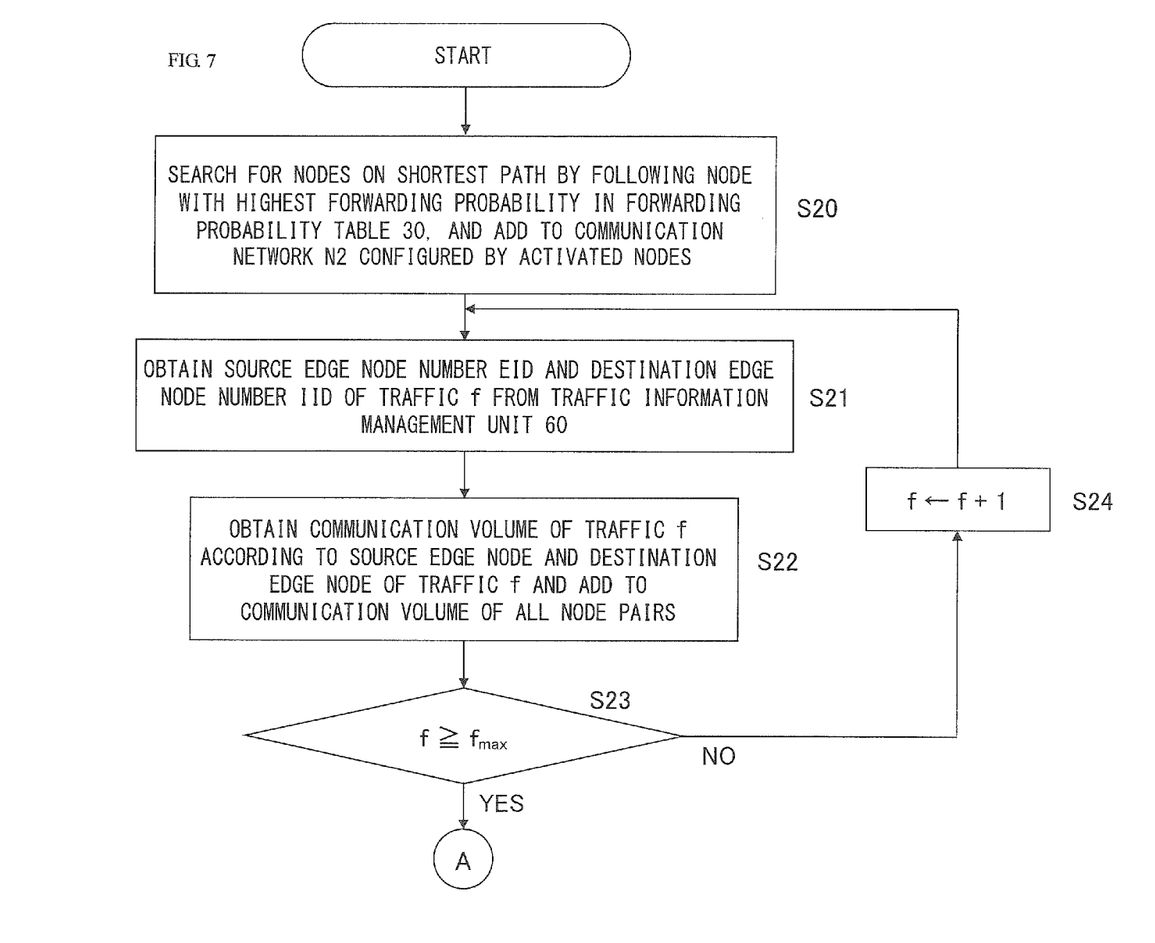
FIG. 7 is a flow chart (first part thereof) showing an operation of the power control unit of the control server according to the exemplary embodiment.
Figure 8:
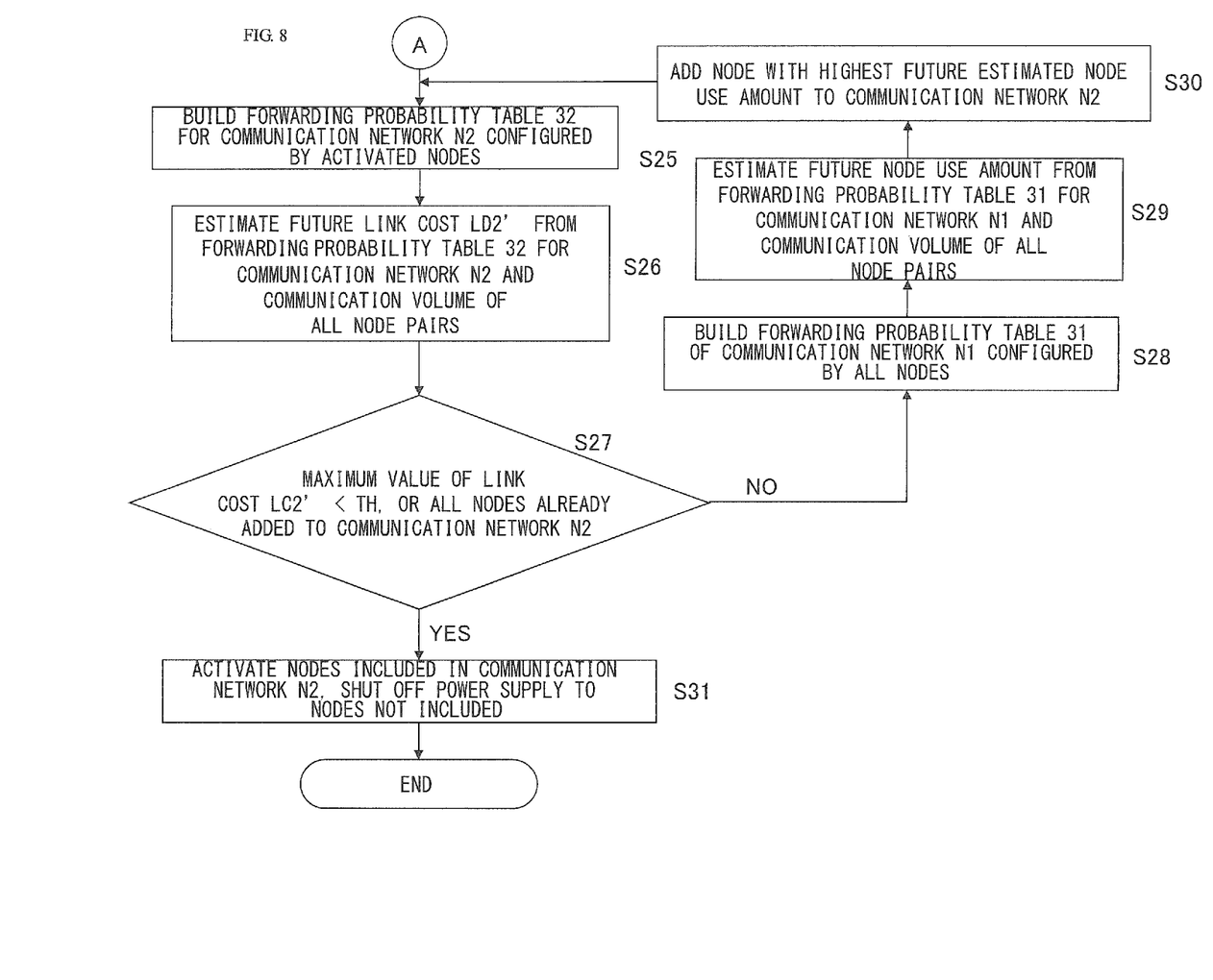
FIG. 8 is a flow chart (second part thereof) showing an operation of the power control unit of the control server according to the exemplary embodiment.

Next, a detailed description is given concerning operations of the power control unit 50. FIG. 7 and FIG. 8 are flow charts showing a power control method by the power control unit 50. FIG. 7 shows an operation (steps S20 to S24) of the node selection unit 51. Meanwhile, FIG. 8 shows an operation (steps S25 and S26) of the link cost calculation unit 52, an operation (steps S27 to S30) of the node addition unit 53, and an operation (step S31) of the node control unit 54. It is to be noted that FIG. 7 and FIG. 8 are linked at a connector A.

Referring to FIG. 7, the node selection unit 51 has the communication network N2 configured by the activated nodes as an empty set, and in order to search for nodes in the shortest path from source to destination, with respect to all pairs (every pair) of source node and destination node, follows node(s) with the highest forwarding probability in the forwarding probability table 30, from source node to destination node, and adds the node(s) passed-through to the communication network N2 configured by activated node(s) (step S20).

The node selection unit 51 obtains a source edge node EID or a destination edge node number IID of traffic f, from a traffic information management unit 60 (step S21).

The node selection unit 51 obtains transmitted data volume at the source edge node or received data volume at the destination edge node, with respect to the traffic f, from the source edge node number EID or the destination edge node number IID, and adds to the communication volume of all pairs of nodes (step S22). It is to be noted that in a case where packet loss in the network is ignored, the transmitted data volume and the received data volume match.

Next, the node selection unit 51 checks whether or not search has been performed with regard to the number of traffic items obtained from the transmitted data volume or the received data volume up to the number of flows fmax that are to be investigated (step S23). It is to be noted that the number of flows fmax that are to be investigated is preferably a sufficiently large value, and is a value smaller than the number of traffic items managed.

In a case where the number of traffic items obtained from the transmitted data volume or the received data volume has not reached a number of traffic items fmax that are to be investigated (NO in step S23), the node selection unit 51 adds 1 to the traffic f (step S24), and repeats the processing of steps S21 to S23.

Referring to FIG. 7 and FIG. 8, in a case where the number of traffic items obtained from the transmitted data volume or the received data volume has reached the number of traffic items fmax that are to be investigated (YES in step S23), the link cost calculation unit 52 builds the forwarding probability table 32 for the communication network N2, from the link cost LC2 for the communication network N2 (step S25).

Here, it is possible to employ various types of methods with regard to the method of determining the link cost LC2 for the communication network N2 configured by activated nodes. For example, it is possible to use a method utilizing a present link cost, a method of determining link cost as a constant value, and the like.

Furthermore, as a method of building the forwarding probability table 32 for the communication network N2 from the communication network N2 and the link cost LC2, it is possible to use various methods similar to the methods of building the forwarding probability table 30. For example, in NPL 3 the forwarding probability table 30 is built based on the following expression, the entire disclosure of NPL 3 being incorporated herein by reference thereto.

$$p(j|i) = \exp(-\gamma \cdot c_{ij}) \cdot W_{jd} / W_{id} \quad (1)$$

$$W = (I - A)^{-1} \quad (2)$$

$$a_{ij} = \begin{cases} \exp(-\gamma \cdot c_{ij}) & \text{where link exists between nodes } i \text{ and } j \\ 0 & \text{where no link exists between nodes } i \text{ and } j \end{cases} \quad (3)$$

Here, p(j|i) in expression (1) is an element of the forwarding probability table 30 and represents the forwarding probability from a target node i to a next hop node j, in a case where a destination node is d. In expression (2), I represents a unit matrix. In addition, gamma in expression (3) represents a setting parameter, and $c_{ij}$ represents link cost between i and j. $W_{j\ d}$ and $W_{i\ d}$ in expression (1), and $a_{i\ j}$ in expression (3) are respective elements of a matrix W and a matrix A in expression (2).

Next, the link cost calculation unit 52 estimates the future link cost LC2' for the communication network N2 based on the forwarding probability table 32 for the communication network N2 and the communication volume between all node pairs (step S26).

The link cost calculation unit 52 uses the forwarding probability table 32 for the communication network N2 to calculate the probability where a link is used between the nodes i and j, for communication between the source node s and destination node d. Next, the link cost calculation unit 52 calculates a communication volume flowing in a link between the nodes i and j, by multiplying the communication volume from the source node s to the destination node d obtained from the communication volume of all node pairs (i.e., every pair of nodes), by the calculated forwarding probability. The link cost calculation unit 52 calculates a use amount of the link between the nodes i and j, by applying the above processing with respect to all source nodes s and destination nodes d. Furthermore, the link cost calculation unit 52 estimates the future link cost LC2' for the communication network N2, based on the calculated link use amount.

It is possible to use various methods with regard to the method of estimating the future link cost LC2'. For example, in a case where the link cost LC is defined as a link utilization rate, it is possible to calculate the link cost in accordance with the following expressions (4) to (6).

$$p_{sdij} = W_{si} \cdot \exp(-\gamma \cdot c_{ij}) \cdot W_{jd} / W_{id} \quad (4)$$

$$l_{ij} \sum_s \sum_d p_{sdij} \cdot O_{sd} \quad (5)$$

$$c'_{ij} = c_{ij} + l_{ij} / (bw_{ij} \cdot t) \quad (6)$$

In expression (5), $O_{s\ d}$ represents volume of data transmitted and received between the source node s and the destination node d. According to expression (6), calculation is performed for a link cost LC2' after time t. In expression (6), $c'_{i\ j}$ represents the link cost LC2' between nodes i and j after time t. In expression (6), $bw_{i\ j}$ represents the link capacity between nodes i and j.

Next, the node addition unit 53 checks whether or not the maximum value of the future link cost LC2' for the communication network N2 configured by activated nodes, which has been estimated, is less than the threshold TH, and whether or not all nodes included in the communication network N1 have been added to the communication network N2 configured by the activated nodes (step S27).

In a case where the maximum value of the link cost LC2' for the communication network N2 configured by the activated nodes in the future is greater than or equal to the threshold TH, and all nodes included in the communication network N1 have not been added to the communication network N2 configured by the activated nodes (NO in step S27), with regard to the link cost of the communication network N1 configured by all nodes, the link cost of links that connect nodes included in the communication network N2 configured by the activated nodes being Cup and the link cost other than of these being Cdown, the node addition unit 53 determines the forwarding probability table 31 for the communication network N1 (step S28). Here, the forwarding probability table 31 for the communication network N1 can be determined by a method similar to the forwarding probability table 30.

Next, the node addition unit 53 estimates the future node use amount NU for the communication network N1, based on the forwarding probability table 31 of the communication network N1 configured by all nodes and the communication volume of all node pairs (step S29).

The node addition unit 53 uses the forwarding probability table 31 for the communication network N1 configured by all nodes, to calculate the probability that a link between the nodes i and j is used in communication between the source node s and destination node d. Next, the node addition unit 53 calculates the communication volume flowing in a link between the nodes i and j by multiplying the communication volume from the source node s to the destination node d obtained from the communication volume of all node pairs (i.e., between nodes of all the node pairs), by the determined forwarding probability. The node addition unit 53 calculates use amount of the link between the nodes i and j, by applying the above processing for all source nodes s and destination nodes d. Furthermore, the node addition unit 53 estimates the future node use amount NU for the communication network N1 configured by all the nodes, from a total value of the link use amount of all the links held by the nodes.

Next, the node addition unit 53 adds the node with the highest total value of future estimated node use amount NU, among the nodes included in the communication network N1, to the communication network N2 (step S30).

After the node addition unit 53 has added a node, once again the link cost calculation unit 52 performs steps S25 and S26. The node addition unit 53 checks whether or not the maximum value of the estimated link cost LC2' of the communication network N2 configured by the activated nodes is less than the threshold TH, and whether or not all the nodes have been added to the communication network N2 (step S27).

In a case where the maximum value of the estimated link cost LC2' of the communication network N2 is less than the threshold TH, or all the nodes included in the communication network N2 have been added to the communication network N2 (YES in step S27), the node control unit 54 activates the nodes included in the communication network N2 and also shuts off power to nodes not included or puts the nodes in a power saving mode (step S31).

According to the control server 100 of the present exemplary embodiment, based on the communication network in which a plurality of paths exist between source and destination and on inter-node traffic forwarding probability, in a path selection method for controlling the communication network, a state where all nodes in a path linking source and destination pair is an initial state, an inter-node traffic forwarding probability in the communication network N2 configured by the already activated nodes is determined, the future link cost of the communication network N2 is estimated by using the forwarding probability and the communication volume assumed to occur in the future, and nodes that are most used when activated are activated, until the cost goes below the threshold. In this way it becomes possible to reduce the power consumption of the communication network while providing adequate throughput for traffic.

The disclosures of above Patent Literature PTL 1 and Non Patent Literatures NPL1-NPL3 are incorporated herein by reference thereto. Modifications and adjustments of the exemplary embodiment are possible within the scope of the overall disclosure (including the claims) of the present invention and based on the basic technical concept of the present disclosure. Various combinations and selections of various disclosed elements (including each element of each claim, each element of each mode or exemplary embodiment, each element of each drawing, etc.) are possible within the scope of the claims of the present disclosure. That is, the present disclosure of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

1 communication system
5-1 to 5-n nodes
5-D source node
5-S destination node
5-i target node
5-j neighboring node
5-r relay node
10 next hop determination unit
20 node setting unit
30 forwarding probability table
30-i forwarding probability table for node 5-i
31 forwarding probability table for communication network N1
32 forwarding probability table for communication network N2
40 path node list
50 power control unit
51 node selection unit
52 link cost calculation unit
53 node addition unit
54 node control unit
60 traffic information management unit
100 control sever
CMD forwarding table setting command
fmax number of traffic items to be investigated
gamma setting parameter
LC1 link cost in communication network N1
LC2 link cost in communication network N2
LC2' future link cost in communication network N2
N1 communication network configured by all nodes
N2 communication network configured by activated nodes
NU future node use amount in communication network N1
$P_{i,j}(k)$ forwarding probability
REQ path setting request
TH threshold

What is claimed is:

1. A control server, comprising:
a node selection unit that selects part of nodes included in a first communication network and generates a second communication network from the selected nodes;
a link cost calculation unit that determines a forwarding probability of a packet between a node and its next hop node in the second communication network to calculate a communication volume between at least one pair of nodes included in the second communication network with respect to a prescribed traffic using the determined forwarding probability, and calculate a link cost for at least one pair of nodes included in the second communication network based on the determined forwarding probability and the calculated communication volume;
a node addition unit that adds at least one node that is included in the first communication network but is not included in the second communication network to the second communication network so that the calculated link cost satisfies a prescribed condition; and
a node control unit that puts at least one node included in the second communication network in a first mode, and the other node(s) in a second mode with a lower power consumption than the first mode.

2. The control server according to claim 1, wherein
the node addition unit judges that the prescribed condition is satisfied in a case where a maximum value of link costs for at least one pair of nodes included in the second communication network is less than a prescribed threshold.

3. The control server according to claim 1, wherein
the node addition unit determines a forwarding probability of a packet between a node and its next hop node in the first communication network, calculates a communication volume between at least one pair of nodes included in the first communication network with respect to the prescribed traffic using the determined forwarding probability; calculates a communication volume for each node included in the first communication network based on the calculated communication volume; and
adds a node with a maximum communication volume to the second communication network.

4. The control server according to claim 1, wherein
the node addition unit determines a forwarding probability of a packet between a node and its next hop node in the first communication network;
calculates a communication volume between at least one pair of nodes included in the first communication network with respect to the prescribed traffic using the determined forwarding probability; calculates link costs of at least one pair of nodes included in the first communication network based on the determined forwarding probability and the calculated communication volume, and adds a node for which sum of link costs of a pair of nodes including the node itself is maximum to the second communication network.

5. The control server according to claim 1, wherein
the link cost calculation unit acquires a transmitted data volume or a received data volume at an edge node with respect to the prescribed traffic; and
uses the acquired transmitted data volume or the received data volume and the determined forwarding probability to calculate a communication volume between at least one pair of nodes included in the second communication network with respect to the prescribed traffic.

6. The control server according to claim 1, wherein
the node selection unit selects all edge nodes from the first communication network; and
selects node(s) along a shortest path connecting all pairs (every pair) of edge nodes.

7. The control server according to claim 1, wherein
the node control unit shuts off power supply of a node(s) not included in the second communication network.

8. A communication system comprising:
the first communication network; and
the control server according to any one of claim 1.

9. A network control method, comprising:
selecting part of nodes included in a first communication network and generating a second communication network from the selected nodes;
determining a forwarding probability of a packet between a node and its next hop node in the second communication network to calculate a communication volume between at least one pair of nodes included in the second communication network with respect to a prescribed traffic using the determined forwarding probability, and calculate a link cost for at least one pair of nodes included in the second communication network based on the determined forwarding probability and the calculated communication volume;
adding a node that is included in the first communication network but is not included in the second communication network to the second communication network;
repeating the determining and the adding, until the calculated link cost satisfies a prescribed condition; and
putting at least one node included in the second communication network in a first mode, and the other node(s) in a second mode with a lower power consumption than the first mode.

10. The network control method according to claim 9, wherein
the prescribed condition is satisfied in a case where a maximum value of link costs for at least one pair of nodes included in the second communication network is less than a prescribed threshold.

11. The network control method according to claim 9, comprising:
determining a forwarding probability of a packet between a node and its next hop node in the first communication network;
calculating a communication volume between at least one pair of nodes included in the first communication network with respect to the prescribed traffic using the determined forwarding probability;
calculating a communication volume for each node included in the first communication network based on the calculated communication volume; and
adding a node with a maximum communication volume to the second communication network.

12. The network control method according to claim, comprising:
determining a forwarding probability of a packet between a node and its next hop node in the first communication network;
calculating a communication volume between at least one pair of nodes included in the first communication network with respect to the prescribed traffic using the determined forwarding probability;
calculating link costs of at least one pair of nodes included in the first communication network based on the determined forwarding probability and the calculated communication volume; and
adding a node for which sum of link costs of a pair of nodes including the node itself is maximum, to the second communication network.

13. The network control method according to claims 9, comprising:
acquiring a transmitted data volume or a received data volume at an edge node with respect to the prescribed traffic; and
using the acquired transmitted data volume or the received data volume and the determined forwarding probability to calculate a communication volume between at least one pair of nodes included in the second communication network with respect to the prescribed traffic.

14. A non-transitory computer-readable recording medium storing a program, that causes a computer to execute:
selecting part of nodes included in a first communication network and generating a second communication network from the selected nodes;
determining a forwarding probability of a packet between a node and its next hop node in the second communication network to calculate a communication volume between at least one pair of nodes included in the second communication network with respect to a prescribed traffic using the determined forwarding probability, and calculate a link cost for at least one pair of nodes included in the second communication network based on the determined forwarding probability and the calculated communication volume;

adding a node that is included in the first communication network but is not included in the second communication network to the second communication network;

repeating the determining and the adding, until the calculated link cost satisfies a prescribed condition; and putting at least one node included in the second communication network in a first mode, and the other node(s) in a second mode with a lower power consumption than the first mode.

15. The non-transitory computer-readable recording medium according to claim 14, wherein the prescribed condition is satisfied in a case where a maximum value of link costs for at least one pair of nodes included in the second communication network is less than a prescribed threshold.

16. The non-transitory computer-readable recording medium according to claim 14, wherein the program causes a computer to execute:

determining a forwarding probability of a packet between a node and its next hop node in the first communication network;

calculating a communication volume between at least one pair of nodes included in the first communication network with respect to the prescribed traffic using the determined forwarding probability;

calculating the communication volume for each node included in the first communication network based on the calculated communication volume; and adding a node with a maximum communication volume to the second communication network.

17. The non-transitory computer-readable recording medium according to claim 14, wherein the program causes a computer to execute:

determining a forwarding probability of a packet between a node and its next hop node in the first communication network;

calculating a communication volume between at least one pair of nodes included in the first communication network with respect to the prescribed traffic using the determined forwarding probability;

calculating link costs of at least one pair of nodes included in the first communication network based on the determined forwarding probability and the calculated communication volume; and adding a node for which sum of link costs of a pair of nodes including the node itself is maximum, to the second communication network.

18. The non-transitory computer-readable recording medium according to claim 14, wherein the program causes a computer to execute:

acquiring a transmitted data volume or a received data volume at an edge node with respect to the prescribed traffic; and using the acquired transmitted data volume or the received data volume and the determined forwarding probability to calculate communication volume between at least one pair of nodes included in the second communication network with respect to the prescribed traffic.

* * * * *